March 27, 1928.

Re. 16,916

D. TRAXLER

GARMENT POCKET

Original Filed Sept. 25, 1922 2 Sheets-Sheet 1

INVENTOR.
DAVID TRAXLER

BY Parker & Burton

ATTORNEY.

March 27, 1928.

Re. 16,916

D. TRAXLER

GARMENT POCKET

Original Filed Sept. 25, 1922 2 Sheets-Sheet 2

INVENTOR.
DAVID TRAXLER

BY Parker & Burton

ATTORNEY.

Reissued Mar. 27, 1928.

Re. 16,916

UNITED STATES PATENT OFFICE.

DAVID TRAXLER, OF FLINT, MICHIGAN.

GARMENT POCKET.

Original No. 1,519,385, dated December 16, 1924, Serial No. 590,285, filed September 25, 1922. Application for reissue filed November 4, 1926. Serial No. 146,267.

My invention relates to an improved pocket structure and particularly to an improved side pocket for a pair of trousers so constructed and arranged as to provide a large compartment of the usual type and a plurality of small compartments arranged as hereinafter described adapted to retain articles disposed therein for safe keeping without danger of their loss or surreptitious removal.

The several meritorious features and important advantages of my invention will more fully appear from the following description of the illustrative embodiment disclosed in the accompanying drawing and defined in the appended claims.

$a$, $a$ are the two legs and $a^2$ is the waist band of a pair of trousers. $a^3$ $a^3$ indicate the entrances to the pockets. The various sub-pockets are indicated in outline by broken lines.

Figure 4:
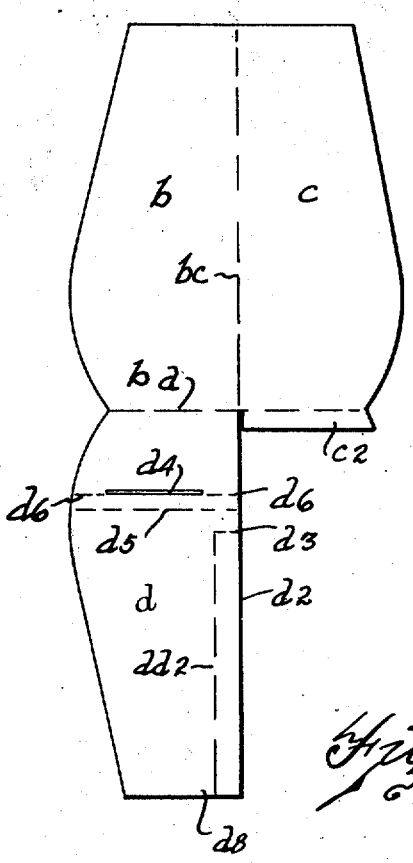
Figure 4 is a plan view of the blank from which the pocket is constructed.
Figure 5:
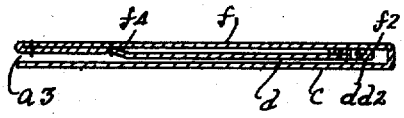
Figure 5 is a section on the line V—V of Fig. 2.

Fig. 4 represents the blank having the three flaps $b$, $c$ and $d$. $b$ and $d$ join each other at their larger ends and $d$ is adapted to be folded over upon $b$ on the line $bd$, and $c$ is adapted to be folded on the line $bc$ over the flap $d$. $c^2$ is a projecting portion extending from the larger end of the flap $c$ which is adapted to be turned over the folded flaps $b$ and $d$ at the line $bd$ when the flap $c$ is folded over on the first-mentioned flap, thus forming a reinforcement on the bottom of the pocket.

$d^4$ is an opening or slit formed in the flap $d$ at the position indicated so that it shall form the entrance to a sub-pocket as hereinafter described.

The pocket is constructed as follows:—

Figure 1:
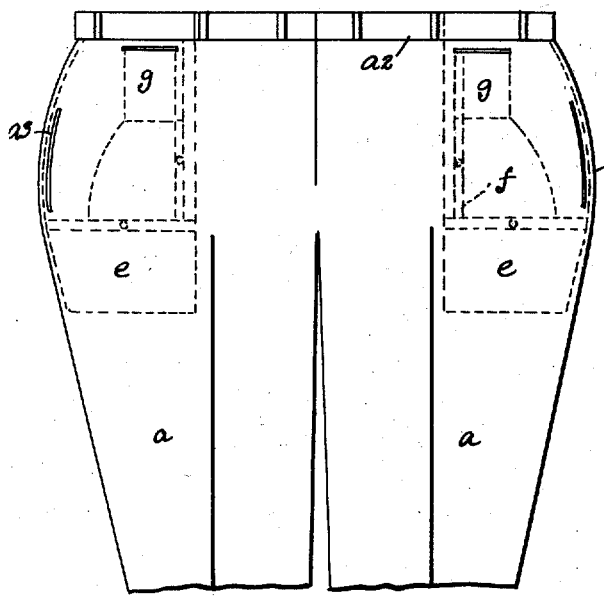
Figure 1 is a front elevation of a garment with pockets embodying my invention attached thereto.
Figure 3:
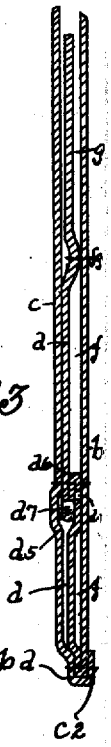
Figure 3 is a section, in the plane indicated by the line III—III of Figure 2, of the completed pocket.
Figure 2:
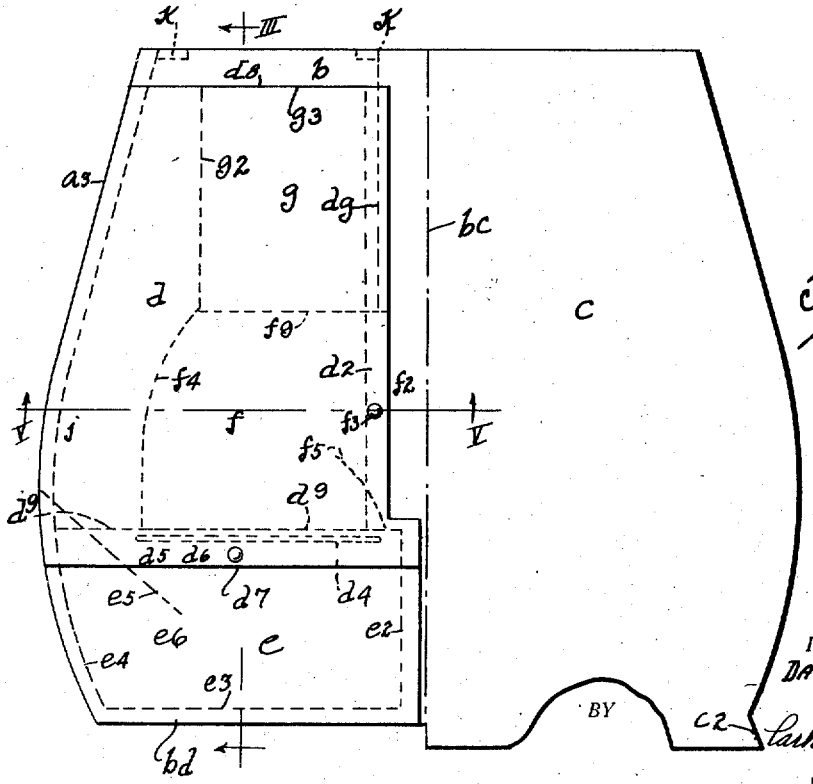
Figure 2 is a plan view of the pocket with the outer flap or fold turned back to more clearly illustrate the construction.

The flap $d$ is bent backward and creased along the line $d^6$ $d^6$ (Fig. 4) and is bent outward along the line $d^5$, thus forming the flap $d^5$ $d^6$ (Figs. 2 and 3), which extends over the pocket entrance $d^4$. The flap $d$ is now bent upward to lie against the surface of the flap $b$, as indicated in Fig. 2, the narrower end $d^8$ of the flap $d$ being brought somewhat below the narrower end of the flap $b$ because of the formation of the pocket flap $d^5$ $d^6$ as above described. The flap $d$ has a slit $d^3$ in its edge and a portion $d^2$ is turned over along the line $dd^2$ to form a reinforcement for the edge, as indicated in Figs. 2 and 4. A line of stitches is now taken at $d^9$ $d^9$ (Fig. 2) and another line of stitches $f^4$ extending upward and curving to the right, as indicated in Fig. 2. $g^2$ indicates a line of stitches extending vertically upward from the top of the line $f^4$. $dg$ indicates a line of vertical stitches along the right hand edge and upper parts of the overturned flap $d$ and $fg$ a horizontal line of stitches joining the lower ends of the line $g^2$ and $dg$.

$f^3$ is a button or clasp.

A line of stitches $e^2$ extends vertically along the lower portions of the flaps $b$ and $d$ joining the same together and from the lower end of the line of stitches $e^2$ extends the horizontal transverse line of stitches $e^3$ which curves to the left and upward in a line of stitches $e^4$. A slanting line of stitches $e^5$ is then taken, as shown in Fig. 2, and an almost parallel line bending inward from the right is taken as indicated at $f^5$ in Fig. 2. By this arrangement the following auxiliary or supplementary pockets are formed.

The pocket $e$ having an entrance $d^4$ and the flap $d^5$ $d^6$ covering the opening thereto, which flaps may be fastened by a button or clasp $d^7$. The line of stitches $e^5$ forms a supplementary pocket at the left of the pocket $e$, as shown in Fig. 2.

The pocket $f$ has its entrance at $f^2$ and is provided with the slanting line of stitches $f^5$ to form a supplementary pocket at its lower and right hand corner, as shown in Fig. 2.

Above the pocket $f$ is the watch, or fob, pocket $g$.

The flap $c$ is now turned over upon the flap $d$ and is secured preferably by the line of stitches $e^2$, $e^3$ and $e^4$, which latter extends up to the point $j$ and by the line of stitches $k$, $k$ extending part way across its upper end, thus leaving along the left hand edge toward the upper part thereof, as shown in Fig. 2, an opening that when secured to the garment registers with the opening $a^3$ and forms the entrance to the pocket formed by the flap *c* covering the flaps *b* and *d* and secured as above described. Of course, access is had to the fob pocket *g* through the unstitched portion of the main pocket between the seams *k*, *k* at the upper end of the flaps *b*, *d* and *c*. The pocket *g* may extend to the upper edge of the waist band or may be located as shown with access thereto from the upper edge of the band or through the flap *c* and material of the garment.

By this construction it will be seen that a readily accessible fob pocket *g* is provided and that a pocket *f* is also provided having its opening at the inner portion of the main pocket so that an article placed in the pocket *f* cannot be gotten at without attracting the attention of the wearer of the garment. The line of stiches $f^5$ forms a supplementary pocket at the front of the pocket *f* so that an article placed in the pocket *f* cannot fall out when the wearer leans forward as it will be caught in the supplementary pocket or receptacle formed by the line of stitches $f^5$. Similarly an auxiliary pocket or receptacle is formed by the line of stitches $e^5$ in which an article placed in the pocket *e* will be caught and retained even if the pocket is reversed in position.

The turning of the auxiliary flap $c^2$ over the edge *bd* forms a reinforced lower portion of the pocket and forms a strong securing means for the flap *c* and flaps *b* and *d*. This edge forming the bottom of the pocket is strengthened also by the integral textile material at the fold *bd* and also by the line of stitches $e^3$.

What I claim is:

1. A multiple pocket structure consisting of three complementary portions overlying each other, the inner and middle portions integrally connected at the bottom of the pocket and stitched to each other at other points so as to form a plurality of pocket compartments, and the third outside portion integral with the inside portion on one vertical edge of the pocket and stitched to the other portions on the remaining edges, thereby forming a large pocket compartment substantially the size of one of the complementary portions.

2. A multiple pocket structure consisting of three complementary portions overlying each other, the inner and middle portions integrally connected at the bottom of the pocket and stitched together on the edges at other points and transversely to form a bottom pocket compartment and a top pocket compartment having an entrance at the side, said inner portion provided with a slit in proximity said transverse stitching whereby an opening is afforded into the bottom pocket compartment, and the third outside portion integrally connected with the inner portion on one side and stitched thereto on the opposite side and at the bottom to form a large pocket compartment open at the top.

3. A multiple pocket structure consisting of a plurality of complementary portions overlying each other, the inner portion integrally connected with the middle portion at the bottom and stitched thereto at other points to form a top and a bottom pocket compartment, the outside portion integrally connected with the inner portion at one side and stitched thereto on the opposite side and having a portion turned thereover at the bottom and stitched thereto to form a pocket compartment substantially the size of one of the complementary portions.

4. A multiple pocket structure comprising three pocket walls, one of which is positioned between the other two, two of said walls integrally secured together at the bottom, two of said walls integrally secured together along one side, two of said walls stitched together along their edges to form a main pocket compartment substantially the size of said walls and provided with an entrance on one side and said intermediate pocket wall secured to one of the other pocket walls by stitching to form a plurality of pocket compartments.

5. A multiple pocket structure comprising three pocket walls, one of which is positioned between the other two, two of said walls integrally secured together at the bottom, two of said walls integrally secured together along one side, two of said walls stitched together along their edges to form a main pocket compartment substantially the size of said walls and provided with an entrance on one side and said intermediate pocket wall secured to one of the other pocket walls by stitching to form a plurality of pocket compartments,—one of said pocket compartments being closed except for an entrance into the main pocket compartment along the edge opposite the entrance to the main pocket compartment.

6. A multiple pocket structure comprising three pocket walls, one of which is positioned between the other two, two of said walls integrally secured together at the bottom, two of said walls integrally secured together along one side, two of said walls stitched together along their edges to form a main pocket compartment substantially the size of said walls and provided with an entrance on one side and said intermediate pocket wall secured to one of the other pocket walls by stitching to form a plurality of pocket compartments,—one of said pocket compartments being closed except for an entrance into the main pocket compartment along the edge opposite the entrance to the main pocket compartment, another of said pocket compartments being closed except for an entrance into the main pocket compartment extending transversely thereof below the entrance to the main pocket compartment and provided with a closure flap depending from the other pocket compartment and positioned immediately thereabove.

7. A multiple pocket structure comprising three pocket walls, one of which is positioned between the other two, one of said outer pocket walls being integrally secured to the intermediate pocket wall at the bottom, said two outer pocket walls being stitched together to form a large pocket compartment and said intermediate pocket wall being stitched to the outer pocket wall with which it is integral to form a pocket compartment located within said large pocket compartment, spaced from the bottom thereof and provided with an entrance on one side only, namely; on the side furtherest removed from the entrance to the main pocket compartment.

DAVID TRAXLER.